United States Patent [19]

Hultén et al.

[11] 4,242,161

[45] Dec. 30, 1980

[54] METHOD AND A MACHINE FOR PRODUCING CELLULAR LATTICEWORK

[75] Inventors: Bengt H. Hultén, Hedemora; Hans T. Skarfelt, Habo; Uno L. Gjertz, Astorp, all of Sweden

[73] Assignee: Munksjo Aktiebolag, Jonkoping, Sweden

[21] Appl. No.: 881,431

[22] Filed: Feb. 27, 1978

[30] Foreign Application Priority Data

Feb. 28, 1977 [SE] Sweden ............................... 7702153

[51] Int. Cl.[3] .......................... B31D 3/04; A01G 9/10; B32B 3/12

[52] U.S. Cl. ......................................... 156/197; 47/77; 493/344; 493/355; 493/966; 493/295; 156/218; 156/227; 156/264; 156/461; 156/467; 156/512; 156/546; 222/94; 229/28 R; 428/116

[58] Field of Search ...................... 47/77; 93/1 F, 1 G, 93/1 H, 37 R; 138/119; 156/197, 217, 218, 227, 264, 461, 467, 512, 546; 222/94; 229/28 R; 270/94; 428/116, 119, 120

[56] References Cited

U.S. PATENT DOCUMENTS

| | | | |
|---|---|---|---|
| 3,164,507 | 1/1965 | Masuda | 156/197 |
| 3,661,682 | 5/1972 | Shoji et al. | 156/548 |
| 3,809,593 | 5/1974 | Burke et al. | 156/264 X |
| 4,102,725 | 7/1978 | Mosse | 156/461 X |
| 4,121,505 | 10/1978 | Tanaka et al. | 93/1 H |

*Primary Examiner*—John T. Goolkasian
*Assistant Examiner*—Robert A. Dawson
*Attorney, Agent, or Firm*—Kane, Dalsimer, Kane, Sullivan and Kurucz

[57] ABSTRACT

A method and a machine for producing a latticework structure composed of cells of essentially parallelepipedon shape from e.g. paper coated on one side with synthetic resin. The web is formed over a mandrel into a sleeve of square cross-sectional shape while being successively advanced, and the sleeve is cut into bits which are flattened and by a step-by-step feeding mechanism positioned adjacent one another with one bit overlapping the following one over halfway in the transverse direction. The bits are bonded together while so positioned whereby flat elements are formed. These flat elements are stacked on top of one another by a mechanism ensuring that the elements are displaced by one cell width in their longitudinal direction and the stack of elements is then cut into pieces having the desired height of the cells. When extended, these pieces form the desired cellular latticework structure.

15 Claims, 16 Drawing Figures

METHOD AND A MACHINE FOR PRODUCING CELLULAR LATTICEWORK

BACKGROUND OF THE INVENTION

The subject invention concerns a method for producing a cellular latticework structure composed of cells of parallelepipedon configuration, the walls of which extend in parallel with the sides of the latticework structure. The walls of the cells consist of materials such as paper, pasteboard, cardboard or corrugated cardboard which is plastic-coated on one side.

Cellular latticework structures of this kind are useful in various fields. For instance, to force forest tree plants boxes are used in which is introduced an inset in the shape of a cellular latticework structure of the kind referred to and in each cell a seed is planted which is allowed to germinate and form a plant. The plants are then, if desired after transplanting, planted on free areas, such as clear-cut areas. The cellular latticework structures may also be used as packages protecting brittle and fragile products, such as eggs, fruit and some vegetables as well as medical bottles, ornamental products of glas or china and similar products. The cellular latticework structures can also be used as insets in ammunition boxes.

SUMMARY OF THE INVENTION

The purpose of the subject invention is to produce a cellular latticework structure in a rational manner which is suitable for serial production. The method in accordance with the invention is charaterised by the steps of applying on a web of a material, such as paper which is coated on one side with plastics, four longitudinally extending and equidistantly spaced folding lines, folding said folding lines while advancing the web, thus forming the latter into a sleeve of square cross-sectional configuration with the marginal portions of the web overlapping, bonding the marginal edge portions of the web together, thereafter flattening the sleeve thus formed successively and cutting the sleeve transversely into shorter pieces, in the following denominated bits, positioning a number of bits in such a manner that one bit overlaps the adjacent one halfway as seen in the transverse direction thereof, interconnecting said bits so as to form a flat element, securing the flat elements thus formed to one another in such a position that they are successively displaced by one cell width in their longitudinal direction and bonding to each one of the two flat sides of the pack of flat elements thus formed a thicker sheet covering the external pack faces entirely and cutting the pack of flat elements into pieces having the desired height of the cells, these pieces, after raising thereof to extended position, forming said cellular latticework structure.

The invention likewise comprises a machine designed to perform the method. The machine is essentially characterised by means to apply equidistantly spaced, lengthwise folding lines on a web of e.g. paper coated on one side with plastics, folding means designed to fold the advancing web into a sleeve having a square cross-sectional configuration with the marginal portions of the web placed in overlapping position, securing means designed to bond together the marginal portions of the web, compressing means to flatten out the successively formed sleeve, cutting means to cut the flattened sleeve transversely into shorter pieces, called bits, a first glue-applicating means to apply glue on one face of each such bit, conveying and gripping means designed to move said bits to a position in which one bit overlaps the adjacent one halfway as seen in the transverse direction, with the applied glue positioned between the bits, a second glue-applicating means to apply lengthwise strings of glue on one side of flat elements formed by interconnecting a number of bits, means to stack said flat elements in such a manner that they are successively displaced by a distance corresponding to the width of one cell in the transverse direction on a sheet extending along the entire pack of flat elements thus formed and likewise provided with strings of glue, and means to advance and deposit a similar sheet on top of this pack of flat elements, and means to cut the pack of flat elements into pieces having the desired height of the cells, said pieces forming the cellular latticework structure after having been raised to extended position.

BRIEF DESCRIPTION OF THE DRAWINGS

The invention will be described in closer detail in the following with reference to the accompanying drawings, wherein.

DETAILED DESCRIPTION OF A PREFERRED EMBODIMENT

Figure 1:
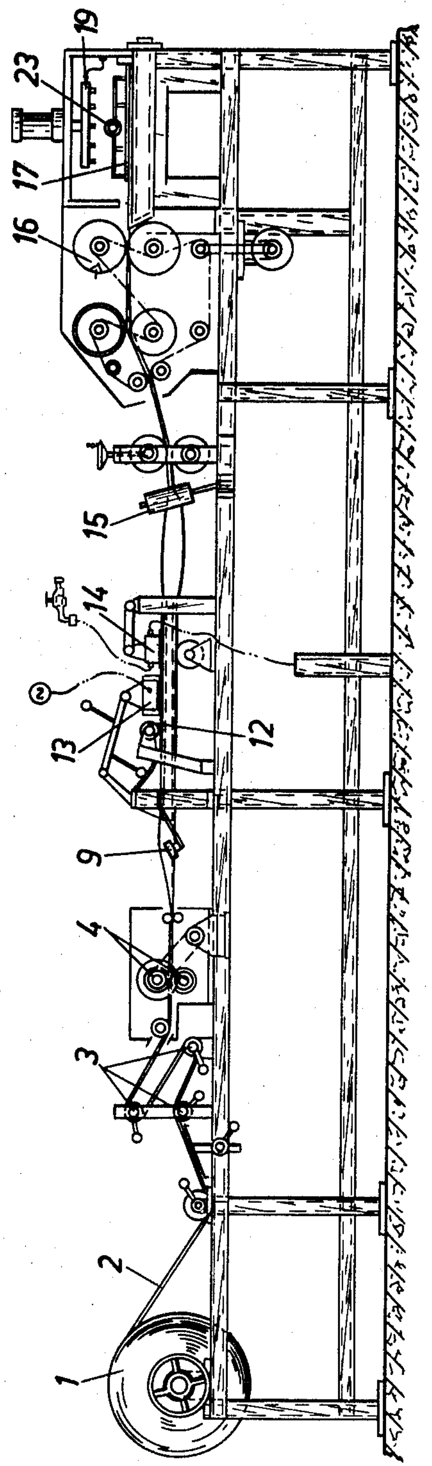
FIG. 1 is a lateral view of the first part of the machine.

A web 2 is unrolled from a roller 1, the web consisting in accordance with the embodiment to be described in the following of paper which is coated on one side with plastics. Via adjustment and drawing rolls 3 the web 2 is passed between two creasing rolls 4 applying four lengthwise, equidistantly spaced folding lines on the web.

Following the creasing rolls 4, as seen in the direction of advancement of the web 2 is arranged a mandrel 6 of essentially square cross-sectional configuration and provided on all faces with longitudinal recesses 7 the purpose of which is to be described in closer detail in the following. While being advanced through the machine, the web 2 is folded about the mandrel 6 into a square sleeve 8. For this purpose, a first pair of small wheels 9, one on each side of the mandrel 6, guides the marginal portions 10 of the web into an overlapping position above the mandrel. To ensure that the web 2 closes tightly about the mandrel 6, guide plates 11 are preferably provided as well as a second pair of small wheels 12 positioned above the mandrel in a vertically oblique position, one on either side of the vertical plane through the lengthwise central axis of the mandrel.

Figure 4:
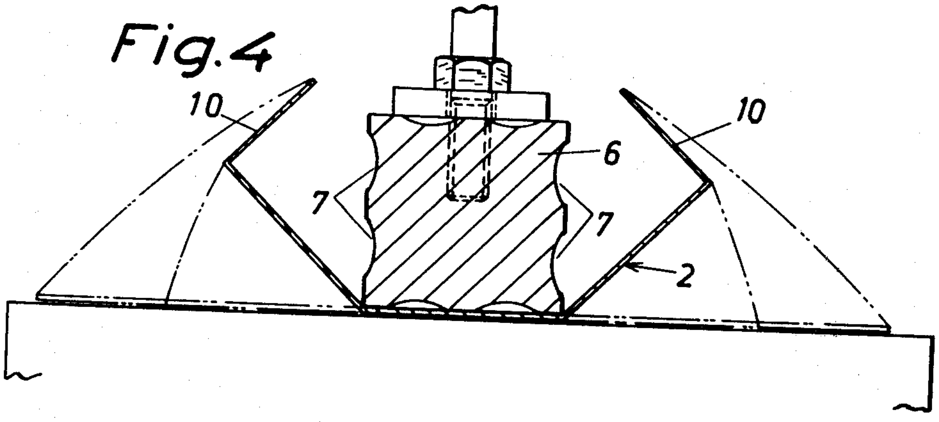
FIGS. 4 to 6 illustrate on an enlarged scale details of a member designed to fold the web.
Figure 5:
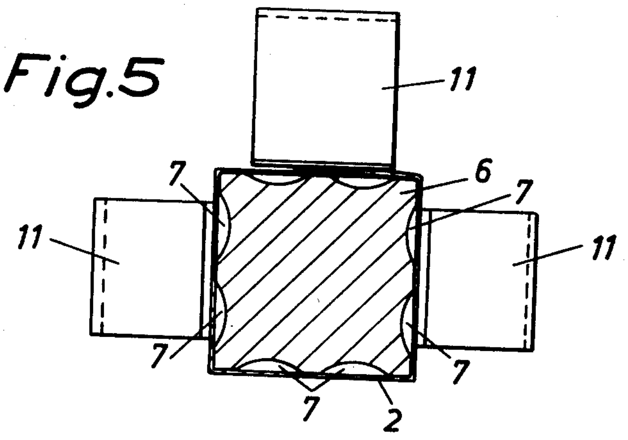
Figure 6:
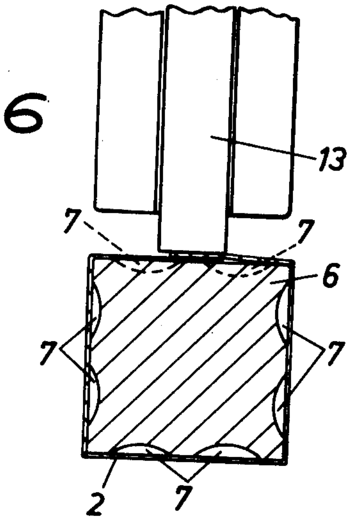

Following the second pair of wheels 12 a heating element 13 is positioned, which element is arranged to gradually heat the plastic layer in the area of the marginal portions 10 of the web to melting temperature while the web is advanced through the machine so as to make the marginal portions tacky and allow them to adhere to one another. Following the heating element 13 a cooling element 14 is provided to cool the joint just formed. FIG. 4 illustrates in a trans-sectional view the web 2 in the initial folding position about the mandrel 6, FIG. 5 illustrates the position when the folding is essentially completed in the area of the guide plates 11, and FIG. 6 shows the sealing of the joint by means of the heating element 13.

The sleeve 8 thus formed is flattened between a couple of compression rolls 15 and the doubled web 2 is further advanced to cutting means 16 cutting the web transversely into shorter pieces, in the following referred to as bits 17.

As the sleeve 8 is flattened by the compression rolls 15, an air cushion is formed behind the latter. However, owing to the provision on the mandrel 6 of lengthwise extending recesses 7, a path is provided through which the air may escape between the mandrel and the internal face of the sleeve. The stream of air gives the positive effect that the friction between the sleeve 8 and the mandrel 6 is reduced, thus minimizing the risk of breaks of the web, should the latter be stretched too tightly.

Figure 2:
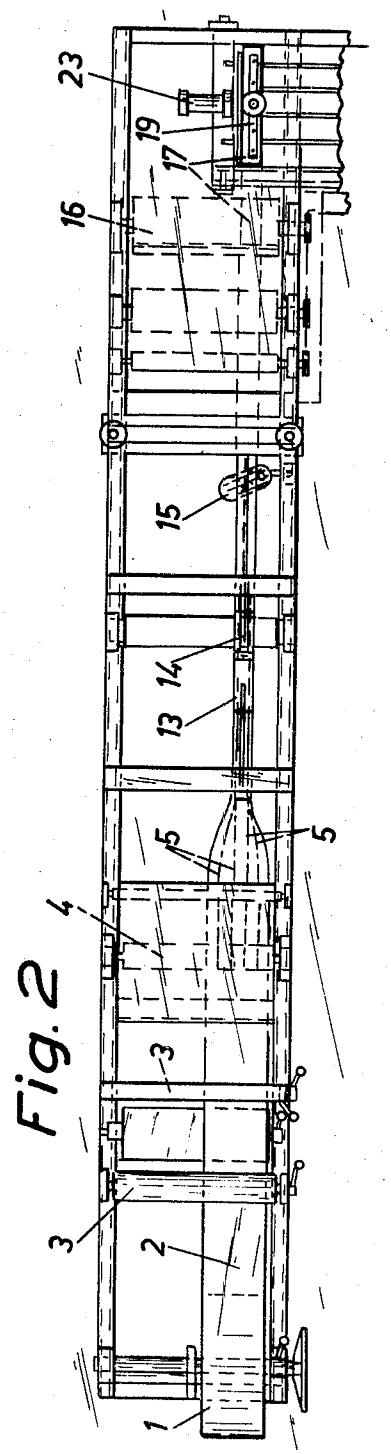
FIG. 2 is a plan view of this part of the machine.
Figure 3:
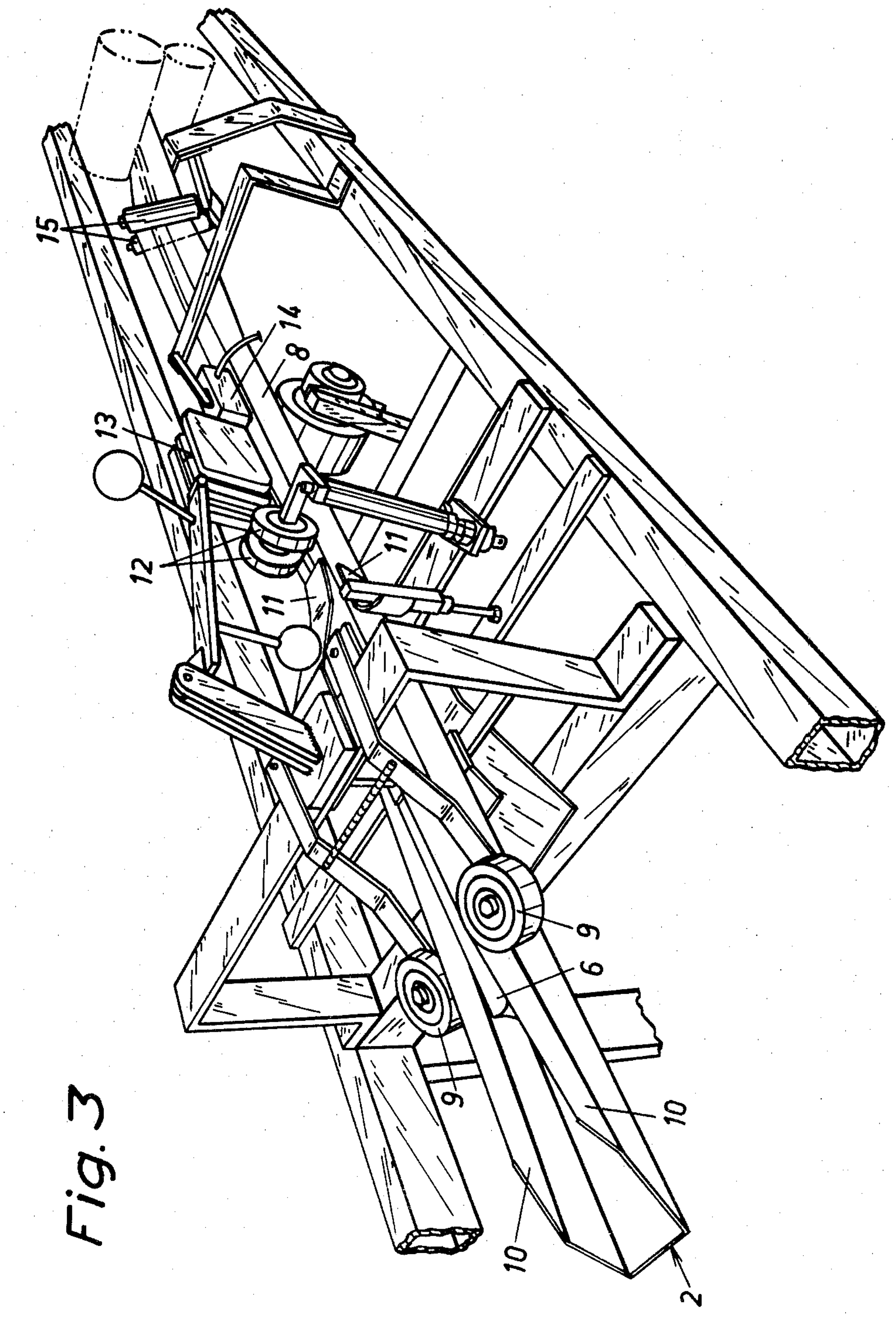
FIG. 3 is a perspective view of the same machine part.
Figures 7, 9, 10:
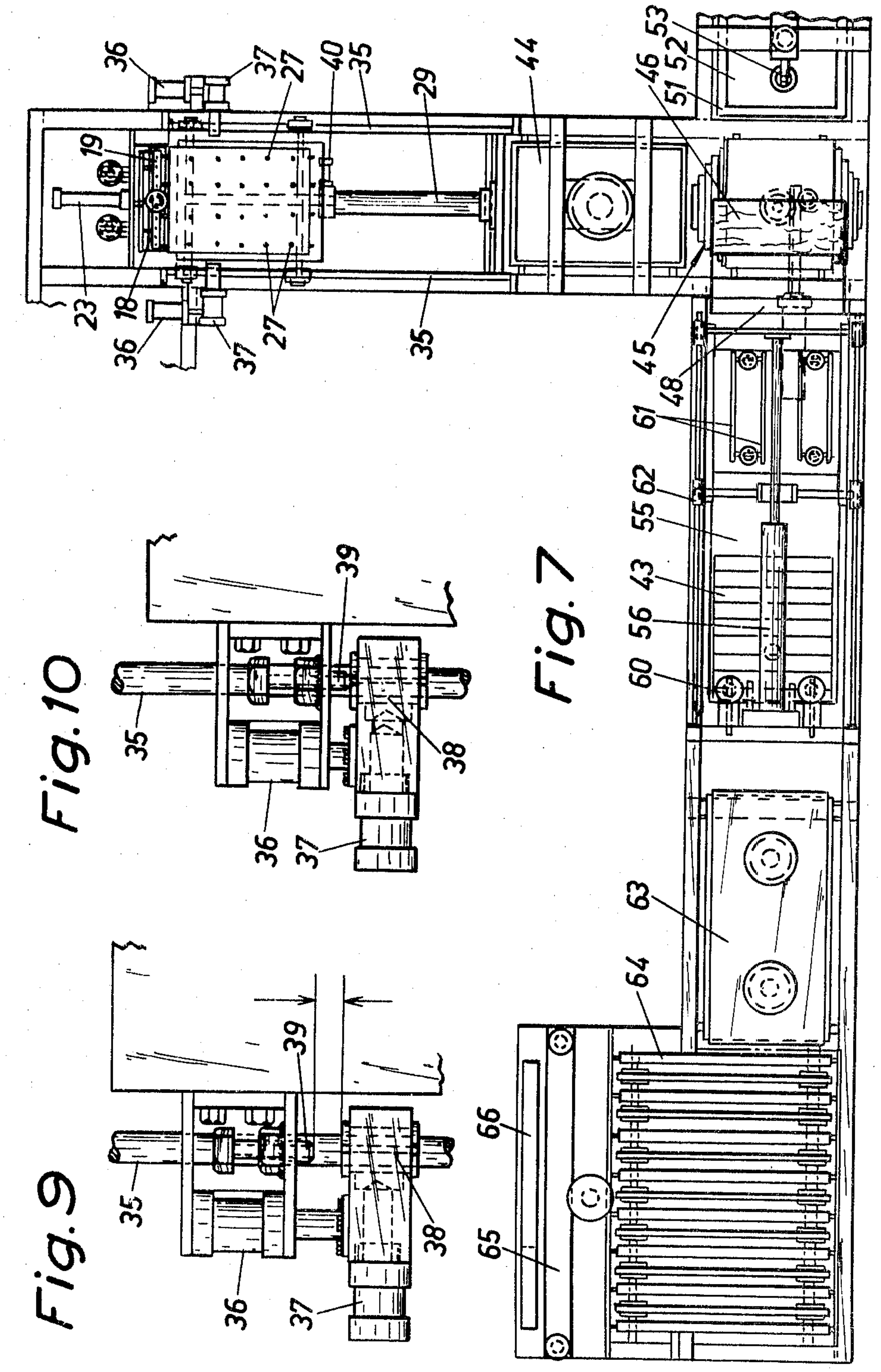
FIG. 7 is a plan view of the intermediate and latter parts of the machine.
FIGS. 9 and 10 illustrate on an enlarged scale a step-by-step feeding mechanism included in the intermediate machine part.
Figure 11:
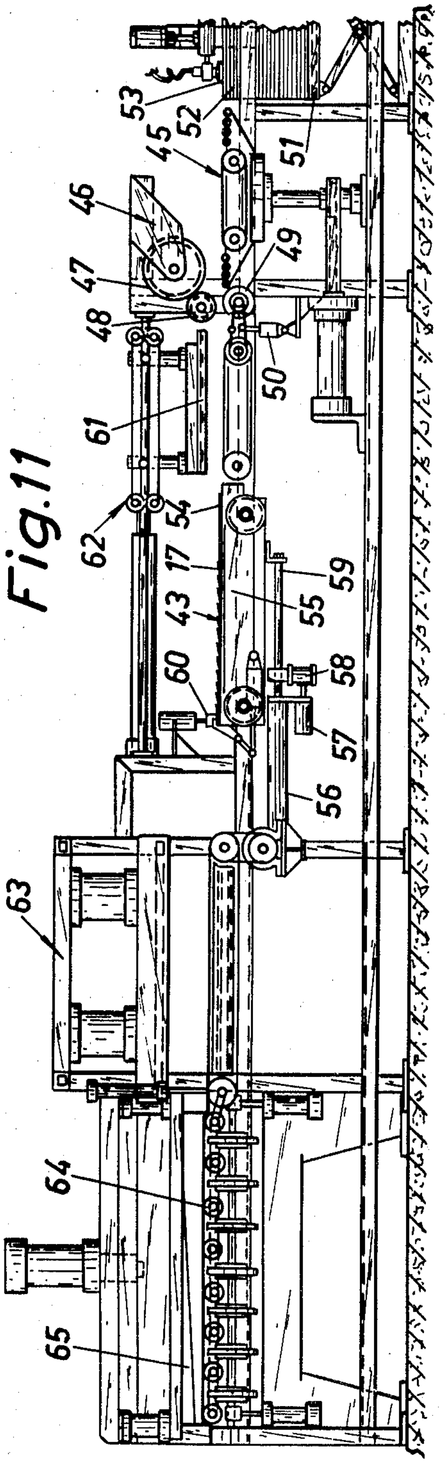
FIG. 11 is a side view of the latter part of the machine.
Figure 8:
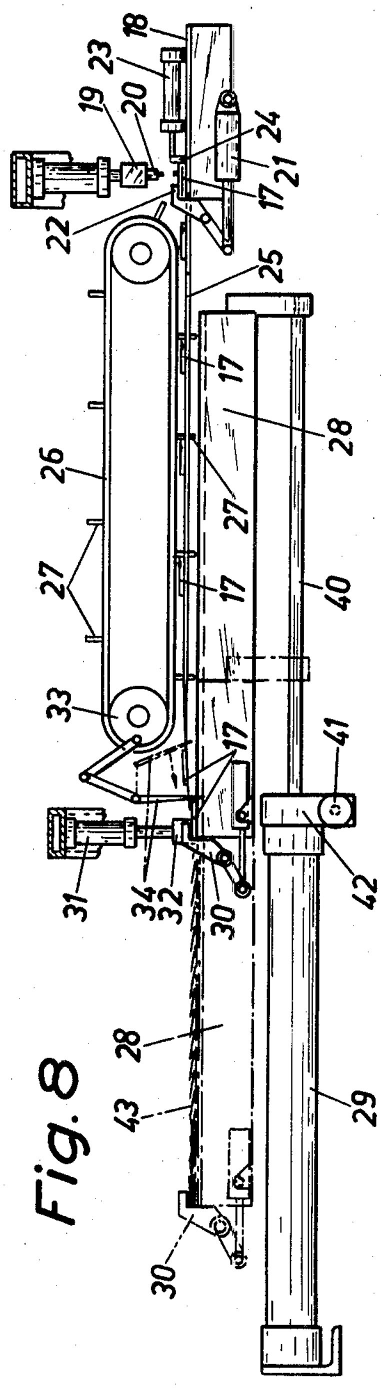
FIG. 8 is a lateral view of the intermediate part.

An overall impression of the entire machine is obtained if the trailing end of FIG. 2 is imagined connected to the starting end of FIG. 7.

As the bits 17 are formed by means of the cutting means 16, they are transported onto a glueing table 18. Above the table is arranged a vertically adjustable rail 19 provided with a number of nozzles 20. Against a bit 17 positioned on the glueing table 18 a clamping means 22 may be pressed by a piston-and-cylinder unit 21 to retain the bit in correct position. When pressed against the bit 17, each nozzle 20 deposits a spot of glue on the bit. Behind the glueing table 18 is arranged a piston-and-cylinder unit 23, and when the rail 19 has been lifted and swung away by the clamping means 22 the cylinder unit 23, assisted by a pusher means 24, displace the bit 17 transversely onto a transport track 25. Above the latter extends a conveyor belt 26 provided with finger means 27 thereon reaching down in longitudinal slots formed in the transport track. Below the latter is arranged a step-by-step feeding table 28 which is displaceable between two extreme positions by means of a traction piston-and-cylinder unit 29. At the forward end of the table 28 is provided a clamping member 30 having the same function as clamping means 22. A presser mechanism 32 which is operated by a piston-and-cylinder unit 31 is arranged above the table 28. A feeder arm 34 is arranged to perform a reciprocating movement and is driven by the forward roller 33 of the conveyor belt 26.

This part of the machine also includes a step-by-step feeding mechanism, see FIGS. 7, 9, and 10. The step-by-step feeding table 28 runs between rods 35 arranged in parallel. In accordance with the embodiment shown in the drawings, one step-feeding machanism is arranged on either side of the table. This mechanism comprises a step-by-step feeding piston-and-cylinder unit 36 which is rigidly secured to the table, and a clamping piston-and-cylinder unit 37 cooperating therewith. The clamping piston-and-cylinder unit 37 exerts its action against a slotted bushing 38 which travels on the rod 35. With the aid of a set screw 39 the length of step may be adjusted as desired. On the piston rod 40 of the traction piston-and-cylinder unit 29 is arranged a clamping ring 42 which is actuated by a transverse clamping piston-and-cylinder unit 41. The piston-and-cylinder unit 41 operates alternatingly with the piston-and-cylinder units 37.

When a bit 17 has received the glue spots, it is conveyed in the manner described above onto the transport track 25 and by the finger means 27 it is pushed transversely against the forward end of the step-by-step feeding table 28, where the feeder arm 34 engages behind the bit when the finger members are swung upwards and pushes the bit from behind into abutment against the presser means 32, which thus forms a stop face. The clamping means 30 clamps the bit securely against the table top. The presser means 32 is lifted off the table top and the step-by-step feeding mechanism again starts its function. The clamping piston-and-cylinder units 37 are in their clamped positions when the step-feeding piston-and-cylinder units 36 are supplied with pressurized medium, whereby the latter units as well as the table 28 are displaced from the position illustrated in FIG. 9 to the position illustrated in FIG. 10, in which the set screw 39 prevents further displacement. The length of this step is equal to half the width of the bit 17. The clamping piston-and-cylinder units 37 now move from their locked positions while the clamping piston-and-cylinder unit 41 is moved to its locked position on the piston rod 40. The following step-feeding movement performed by the piston-and-cylinder units 36 consequently bring about a one-step displacement of the locking piston-and-cylinder units 37 together with their respective bushings 38 on the rods 35.

The next bit 17 advanced by the feeder arm 34 into abutment against the presser member 32, which is now again in lowered position, will be placed in a position wherein it overlaps exactly half the first bit. The advancement proceeds in this manner step by step, until a flat element of the desired length is built up by bits 17. This flat element 43 is removed from the step-by-step feeding table 28 and into a press 44 wherein the bits 17 are exposed to pressure, which improves their adherence. The step-by-step feeding table 28 is displaced one step, back to its original position, by the traction piston-and-cylinder unit 29.

The press 44 is followed by a turning device 45, followed in turn by additional glue applicating means. The latter comprise a glue pot 46 with a glue roller 47, a number of glue wheels 48 and a counter-pressure roller 49 arranged to be raised and lowered by a piston-and-cylinder unit 50.

On the opposite side of the turning device 45 a sheet storage 52 is positioned on a lifting table 51 and suction cups 53 are arranged to remove sheets 54 from the storage, one by one.

A second step-by-step feeding table 55 is positioned after the glue applicating means. It operates essentially in the same manner as the first step-by-step feeding table 28 with the aid of a traction piston-and-cylinder unit 56, a step-by-step feeding piston-and-cylinder unit 57 and a clamping piston-and-cylinder unit 58. However, the design thereof is somewhat simplified in that the step-by-step feeding piston-and-cylinder unit 57 is positioned adjacent the traction piston-and-cylinder unit 56 and that the clamping piston-and-cylinder unit 58 which cooperates with the step-by-step feeding piston-and-cylinder unit is disposed on the piston rod 59 of the traction piston-and-cylinder unit. When the piston-and-cylinder unit 57 performs a step-feeding movement, the piston-and-cylinder unit 58 is in locked position and as a result, the table is displaced one step in the direction of advancement. When the piston-and-cylinder unit 57 thereafter is to carry out its re-set movement preparatory to a further one-step feeding operation, the piston-and-cylinder unit 58 is no longer in its locked position but free to slide along the piston rod 59. Also at this point a presser means 60 is provided to ensure that the table 55 remains immobile during this movement.

A sheet 54 is removed from the sheet storage 52 and is transported via the turning mechanism 45 in between the glue applicator wheels 48 and the counter-pressure roller 49, whereby on the upper face of the sheet a number of lengthwise glue strings are applied, and the sheet is then further advanced onto the step-by-step feeding table 55. A flat element 43 is in the same manner advanced via the turning mechanism 45 through the glue applicating means and while so advanced it is likewise provided on its upper face with lengthwise glue strings. Thereafter, the flat element 43 is lifted off by suction rails 61 engaging the sheet intermediate the glue strings, these rails being supported in a carriage 62, and the element is moved in over the table 55 and is deposited on top of the above-mentioned sheet 54. The table 55 is advanced one step and the presser means 60 is pressed against the forwards edge of the flat element 43. When the subsequent flat element 43, having undergone the same treatment, is deposited in abutment against the first flat element, means 60 will form a stop shoulder, against which abuts the second element, thus ensuring that the latter elements will be placed in a position in which it is displaced rearwardly one step, which equals the width of one cell.

A number of flat elements 43 are thus bonded to one another, while forming a gradually rearwardly displaced pack of elements 43*a*. When the desired number of flat elements have been advanced, a further sheet 54 is removed from the sheet storage 52. As this sheet is not to be provided with glue strings on its upper face, the piston-and-cylinder unit 50 depresses the counter-pressure roller 49 somewhat, allowing the sheet to pass freely between the roller and the glue-applicating wheels 48.

Figure 15:
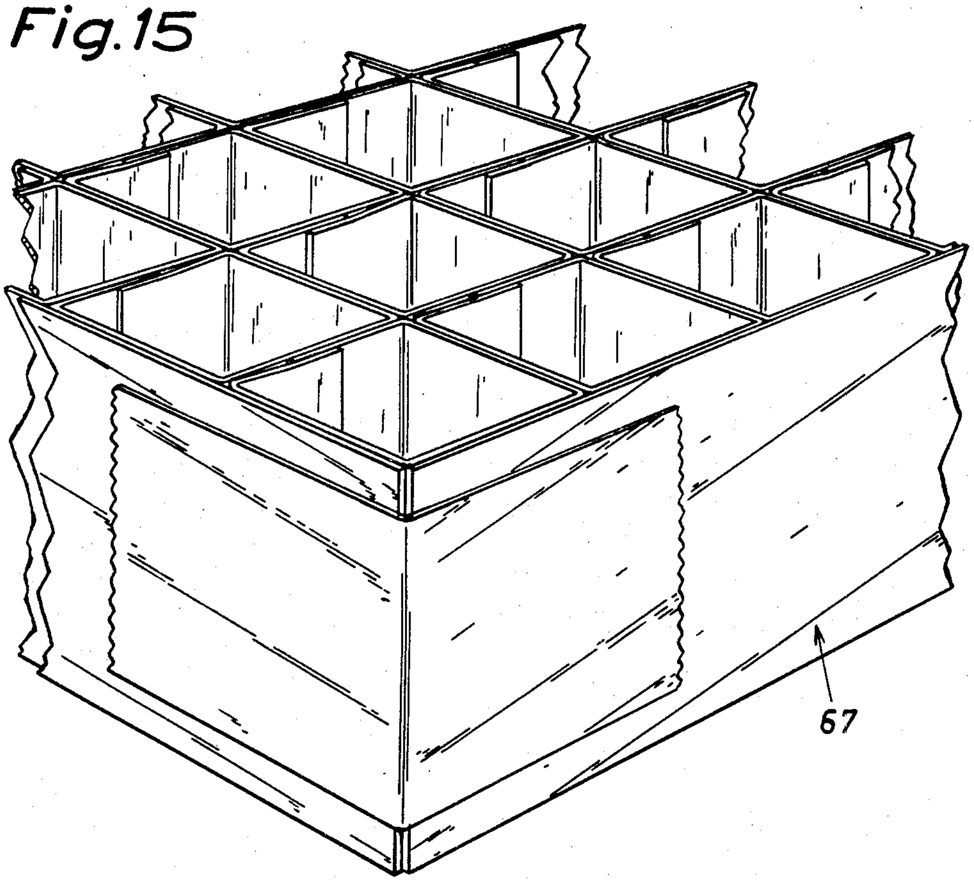
FIG. 15 illustrates on a considerably enlarged scale a corner section of the cellular latticework structure.

The upper and the lower sheets 54 cover the pack of elements 43*a* entirely. From the second step-by-step feeding table 55, the package of elements 43*a* is advanced onto a second press 63, wherein the glue is allowed to form secure bonds between the flat elements and between the elements and the sheets covering them. From the press 63 the pack of elements 43*a* is moved onto a conveyor 64 from which it is finally passed through a cutting mechanism 65 which cuts up the element pack 43*a* into pieces 66 corresponding to the desired height of the cells. When a piece 66 thus produced is extended in the transverse direction, a cellular latticework structure is formed, see FIG. 14 or 15.

Figures 12, 13, 14:
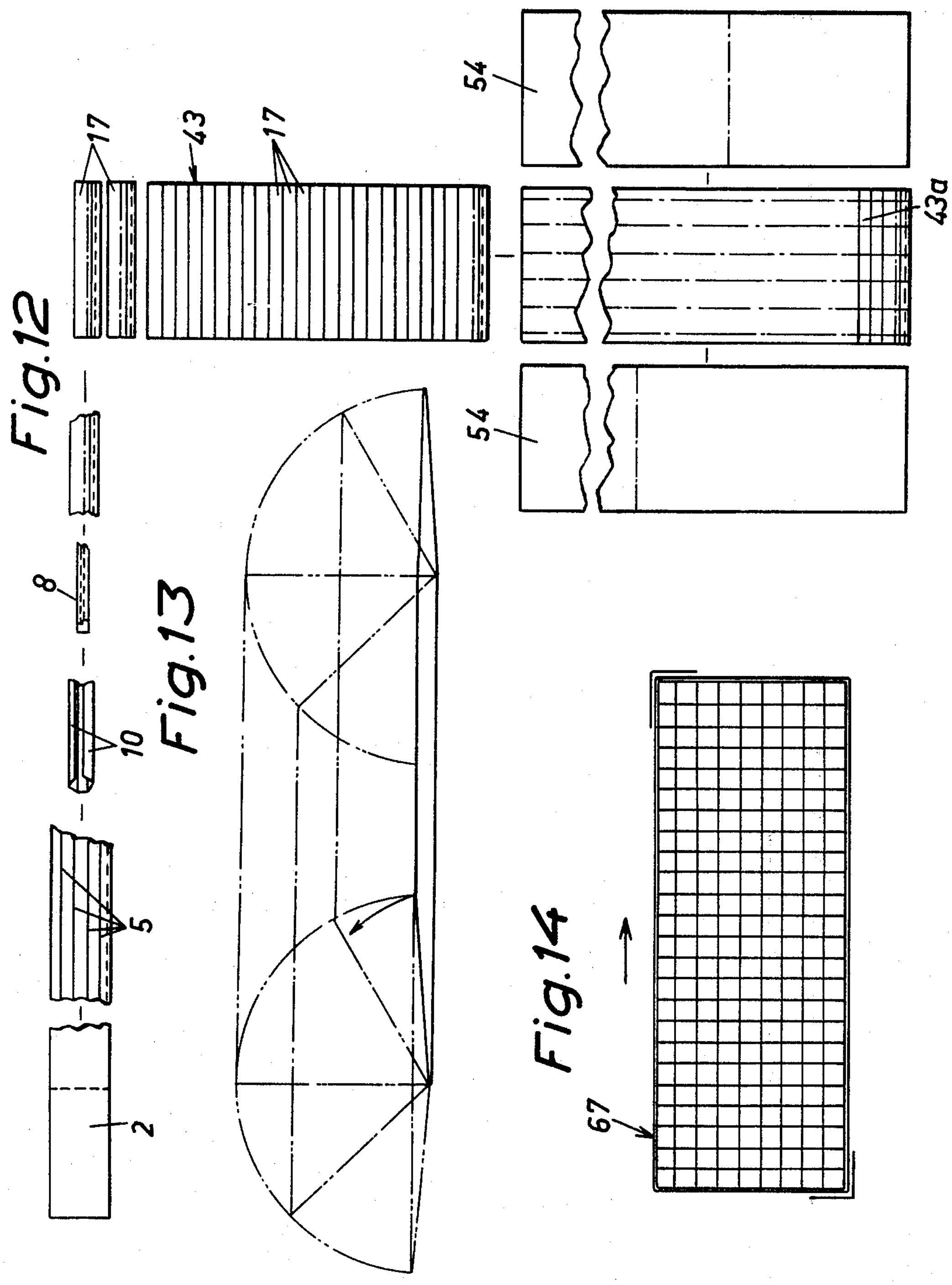
FIG. 12 illustrates schematically the process of forming a cellular latticework structure in accordance with the invention.
FIG. 13 illustrates a cellular latticework structure in the folded together position thereof.
FIG. 14 illustrates the same structure when raised to extended position.

As the pieces 66 are cut to size, it may be convenient to turn them over from one folded position to another, as is illustrated diagrammatically in FIG. 13. Should the cellular latticework structure not have been glued together in the correct manner, this turning-over operation cannot be performed smoothly, if at all. This simple checking operation thus gives instant information as to whether the finished product is acceptable or not.

Figure 16:
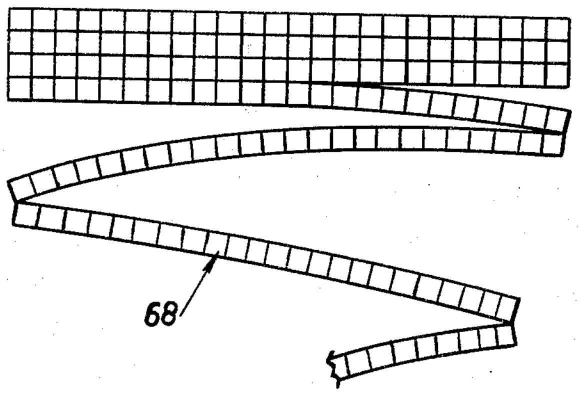
FIG. 16 illustrates schematically the cellular latticework structure after dissolving of the bond between the rows of cells.

If a water-resistant glue is used in the glue station where the bits 17 are bonded together and a water-soluble glue is used in the glue station where the flat elements 43 are bonded together, the result will be that after some time—and provided the cellular latticework structure during this time is exposed to e.g. the decomposing effects of water—rows of cells are obtained that easily can be formed into continuous lengths of cells 68, see FIG. 16. This is of considerable importance when the cells are used for cultivation and planting of forest tree plants, where such lengths of cells can be made use of in a rational manner, when the plants are to be planted with the aid of machines.

The invention is not limited to the embodiment illustrated and described but lends itself to modifications in a variety of ways within the scope of the appended claims. The heating of the bits 17 could be performed with the aid of e.g. infra-red radiation while the bits are being transported on the conveyor track 25, and if combined with the use of an appropriately chosen glue, it is possible to obtain rapid bonding of the bits, making the subsequent press 44 superfluous. The same is true as concerns the bonding of the flat elements 43. As an alternative, it is possible to utilize the plastic coating on the web 2 to bond together the bits 17 as well as the elements 43. In the case, lengths of cells 68 cannot be produced.

Instead of the cutting means 65 it is possible to arrange, after the press 65 and provided a modified conveyor means is used, longitudinally extending parallel circular saw blades or saw chains which, when a pack of elements 43*a* is discharged from the press 63 cut the pack of elements into a number of pieces 66 in a single operation.

What we claim is:

1. An improved method of producing a cellular latticework structure composed of cells of parallelepipedon shape the walls of which extend in parallel with the sides of the latticework and composed of e.g. paper, pasteboard, cardboard, corrugated cardboard or the like, which is coated with plastics on one side, the improvement comprising the steps of applying on a web of e.g. paper treated as indicated above, four longitudinally extending, equidistantly spaced folding lines, folding said folding lines while advancing said web, thus forming said web into a sleeve of square cross-sectional configuration with the marginal portions of said web overlapping, bonding said marginal edge portions of said web together and thereafter flattening said sleeve, the latter being formed successively, and cutting said sleeve transversely into shorter pieces, called bits, positioning a number of said bits in such a manner that one bit overlaps the adjacent one halfway as seen in the transverse direction, and bonding said bits together to form a flat element, securing said flat elements thus formed to one another in such superposed positions that said flat elements are successively displaced by one cell width in their longitudinal direction and form a pack with flat sides, and bonding to each one of said two flat sides of the pack of flat elements thus formed, a thicker sheet covering the external faces of said pack entirely, and thereafter cutting said pack of flat elements into pieces having the desired height of the cells, said pieces of desired height, after extension thereof, forming said cellular latticework structure.

2. An improved method as claimed in claim 1, comprising bonding said marginal portions of said web to one another by means of heat sealing the plastics coating on said web.

3. An improved method as claimed in claim 1, comprising bonding said bits to one another by means of a water-resistant glue in order to produce a durable bond.

4. An improved method as claimed in claim 1, comprising bonding said bits to one another by means of hot-melting said plastics coating in order to produce a durable bond.

5. An improved method as claimed in claim 1, comprising bonding said bits to one another by means of heat sealing said plastics coating in order to produce a durable bond.

6. An improved method as claimed in claim 1, comprising applying a water-soluble glue on each one of said flat elements prior to the deposition thereon of the subsequent flat element, in order to produce a dissolvable bond between said flat elements.

7. A machine for producing a cellular latticework structure composed of cells having a parallelepipedon shape and the walls of which are positioned in parallel with the sides of said latticework structure, said cells composed of e.g. paper, pasteboard, cardboard, corrugated cardboard, or the like coated with plastics on one side, the improvement comprising means to apply equidistantly spaced, lengthwise folding lines on a web of e.g. paper coated on one side with plastics, folding means designed to fold said web while advancing the web successively, so as to form said web into a sleeve having a square cross-sectional configuration with the marginal portions of said web placed in overlapping position, securing means designed to bond together said marginal portions of said web, compressing means to flatten out said successively formed sleeve, cutting means to cut said flattened sleeve transversely into shorter pieces, called bits, a first glue-applicating means for application of glue on one face of each such bit, conveying and gripping means designed to move said bits to a position wherein one bit overlaps the adjacent bit halfway as seen in the transverse direction, the said applied glue being positioned between said bits, a second glue-applicating means for application of lengthwise strings of glue on one side of flat elements, said elements formed by interconnecting a number of bits, means to stack said flat elements in such superposed positions that said flat elements are successively displaced over a distance corresponding to the width of one such cell in their longitudinal direction, a first sheet likewise provided with strings of glue extending along the entire pack of said elements thus formed, said flat elements being stacked onto said sheet in their superposed, successively displaced positions, and means to a advance and deposit a second similar sheet on the top of said pack of flat elements thus formed, and means to cut said pack of flat elements into pieces having the desired height of said cells, said pieces of desired height forming said cellular latticework structure after extension thereof.

8. An improved machine as claimed in claim 7, wherein said folding means comprise a mandrel of substantially square cross-sectional shape and a first pair of small wheels positioned one on each side of said mandrel, said wheels arranged to guide said marginal portions of said web inwards into overlapping position on top of said mandrel.

9. An improved machine as claimed in claim 7, comprising a second pair of small wheels, said second pair of wheels positioned above said mandrel in a vertically oblique position on either side of the vertical plane through the longitudinal axis of said mandrel, said wheels arranged to press against said marginal portions of said web, thus ensuring that said marginal portions are moved into fully contacting and overlapping positions.

10. An improved machine as claimed in claim 7, wherein said securing means comprise a heating element designed to heat to melting temperature said plastics coating at said marginal portions of said web, and a cooling element for cooling the bond produced in said heat-sealing operation.

11. An improved machine as claimed in claim 7, wherein said compression means comprise two compression rolls arranged to flatten out said sleeve formed by the interconnection of said marginal portions of said web, said flattening effected during the passage of said sleeve between said rolls.

12. An improved machine as claimed in claim 8, comprising recesses formed in said mandrel, said recesses extending in the longitudinal direction of said mandrel and of said web, a rearwardly directed stream of air produced by an excess of air in said sleeve and generated in said flattening-out operation of said sleeve, said recesses provided to allow passage of said rearwardly directed stream of air.

13. An improved machine as claimed in claim 7, wherein said conveying and gripping means comprises a piston-and-cylinder unit arranged, after application of glue on said bits, to transport said bits, one by one, onto a transport track, a step-by-step feeding table, finger members on said transport track, said finger members arranged to push said bits along said transport track and onto said step-by-step feeding table, a feeder arm arranged to feed one bit after the other to a position wherein one bit overlaps the immediately preceding bit, a step-by-step feeding mechanism arranged to displace said step-by-step feeding table one step for each bit thus fed, and clamping means arranged to retain said bits in their overlapping positions while they are being advanced on said step-by-step feeding table.

14. An improved machine as claimed in claim 13, comprising horizontal rods, said step-by-step feeding table running between said horizontal rods, a traction piston-and-cylinder unit arranged to displace said step-by-step feeding table between the two extreme positions of said table, said step-by-step feeding mechanism rigidly connected to said table and arranged to travel on at least one of said rods, said step-by-step feeding mechanism comprising a step-by-step feeding piston-and-cylinder unit, a first clamping piston-and-cylinder unit arranged, when said table advances one step, to be locked against said rod, and a second clamping piston-and-cylinder unit arranged to lock said piston rod of said traction piston-and-cylinder unit and to operative alternatingly with said first clamping piston-and-cylinder unit.

15. An improved machine as claimed in claim 13, wherein said clamping means, while securing one or several of said bits, simultaneously serves as a stop shoulder so as to bring the following one of said bits to its correct overlapping position.

* * * * *